INVENTOR.
WILLIAM RICHARD CAKE
ATTORNEY

Nov. 15, 1966  W. R. CAKE  3,285,706
CONTINUOUS FUSION APPARATUS
Filed Sept. 26, 1960  3 Sheets-Sheet 2

INVENTOR.
WILLIAM RICHARD CAKE
BY
ATTORNEY

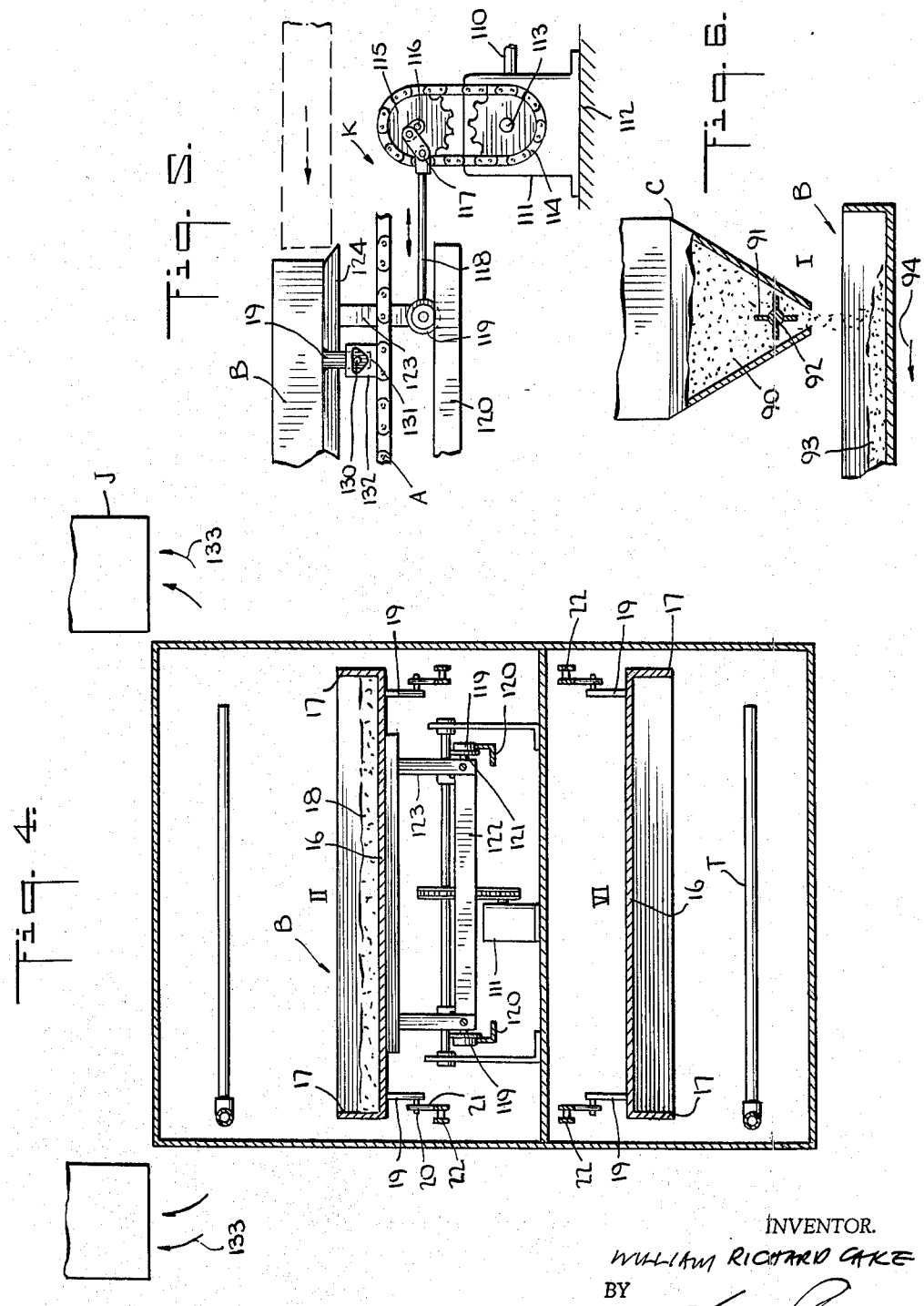

United States Patent Office 3,285,706
Patented Nov. 15, 1966

1

3,285,706
CONTINUOUS FUSION APPARATUS
William R. Cake, Glen Rock, N.J., assignor to Alliance Color and Chemical Corporation, Newark, N.J., a corporation of New Jersey
Filed Sept. 26, 1960, Ser. No. 58,541
6 Claims. (Cl. 23—277)

The present invention relates to a continuous fusion process, and it particularly relates to an apparatus for carrying out chemical fusion reactions.

In normal fusion procedures, such as are involved in fusion sodium hydroxide with sodium benzene sulfonate, a batch process is utilized.

This batch process involves many disadvantages due to loss in time and departure from the preferred operating conditions.

For example, it is necessary to reheat the fusion pot each time a new batch is to be treated with loss in time and departure from preferred conditions, and it also is not readily possible to carry out the fusion step so that it will be coordinated with subsequent operations involving processing of the fusion reaction product.

Batch-wise fusion operations also prevent uniform heating of the reaction mixture since the reagents must be added gradually, and as a result, material introduced first may be heated too long while those added last would be heated for too short a period with the quality and yield of the product being decreased.

Furthermore, more expensive equipment must be utilized for batch-wise operations with more labor and greater time to obtain a predetermined rate of production.

It is among the objects of the present invention to provide a simple, reliable system for producing chemical fusion reactions in which the chemical reaction mixture is fused to produce a desired chemical product with high yield and at relatively low cost and with a maximum saving in labor and apparatus costs.

Another object is to provide a process for producing naphthalene reaction products with a minimum reaction time and with high yield by fusion procedures and particularly to produce hydroxylated or hydroxylated aminated naphthalene compounds with high yield by mass reaction requiring a minimum of manual supervision and with a minimum of undesirable by-products.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

According to the preferred procedure of the present invention, a series of trays serving as reaction chambers are caused to be carried upon an endless belt, and the successive stages receive the reaction mixture, carry the reaction mixture into heating chambers, followed by quenching chambers, and they finally are dumped, rinsed and returned to initial position where they again receive a charge of the raw materials to be reacted together.

In one preferred form of the invention, the endless chain first carries the trays upright under a feeding hopper and then under heating elements in an oven to cause the fusion reaction to take place.

The trays are then passed into a quenching chamber where the reaction is caused to stop and then the trays are inverted as the chain is reversed with dumping into

2 a collection chamber followed by rinsing to clean the trays.

Then after the trays are returned to their initial position, they may be preheated.

In another preferred form of the invention, the mixture of caustic alkali, preferably caustic potash, is combined with naphthalene sulfonic acid or amino naphthalene sulfonic acid which in the first stage at about 250° C. is heated to cause melting and to eliminate the water and then is fused at 300° to 350° C. to cause a reaction between the caustic potash and the naphthalene sulfonic acid to cause replacement of the sulfo-group by a hydroxy-group.

This reaction will be abruptly stopped by a quenching with water after a predetermined period of time with the steam generated being removed and then the trays are inverted as the chain is turned around to dump the fused product liquor containing the naphthol which has been produced.

It has been found that the trays in this process should hold a desirably thin layer of the ingredients which should be spread uniformly and evenly over the full width thereof, and that the thickness of the layers should vary from ½ to ¾" with an average of ⅝".

It has been found that if the mixture of the caustic alkali, preferably caustic potash, and the naphthalene sulfonic acid is less than ½", there is a tendency toward forming undesirable by-products whereas if it is much thicker than ¾", there is a tendency that the complete mass will not satisfactorily react and will not properly fuse.

It also has been found that the time of treatment is important and the belt should carry the trays carrying the spread mixture having a thickness between ½ to ¾" at a rate so that it will first be treated at 250° C. for about 90 to 180 seconds, with an optimum of 165 seconds, then at 325 to 350° C. for 90 to 180 seconds, with an optimum of 165 seconds, and then quenched and rinsed for a period of time equal to the station time in the feeding and heating stages.

During both high temperature treatments, the trays containing the layer of a mixture of potassium hydroxide and naphthalene sulfonic acid should be vigorously vibrated to promote uniform melting and fusion.

It has been found that the trays themselves should be of a polished nickel copper alloy such as Monel and that the reflected heating is most important in creating an elevated temperature which will be uniform throughout the mass to create the first dehydration operation at 250° C. with high yield and the second fusion operation at 350° C. with high yield with a resultant yield of much over 80% and frequently as high as 90% of the naphthol.

It is important during the dehydrating and fusion operations that the oxygen of the air be kept away from the reacting materials and this is done by maintaining a positive pressure of deoxygenated combustion gases or other inert gases in which the dehydration and fusion operations are carried on, with the gases being caused to pass out through the openings of the ovens and being picked up by other hoods to prevent them from contaminating the air in the room or shed in which the reaction is carried out.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is a transverse sectional view upon the line 4—4 of FIG. 1 showing the first stage heating operation in the upper part of the view and the preheating stage in the lower part of the view.

FIG. 5 is a fragmentary side diagrammatic elevational view showing the shaking or vibration mechanism which is applied at the middle right hand portion of FIG. 1, upon an enlarged scale as compared to FIG. 1.

FIG. 6 is a diagrammatic side sectional view of the lower part of the feeding hopper of FIG. 1 showing the manner in which the material is spread.

Figure 1:
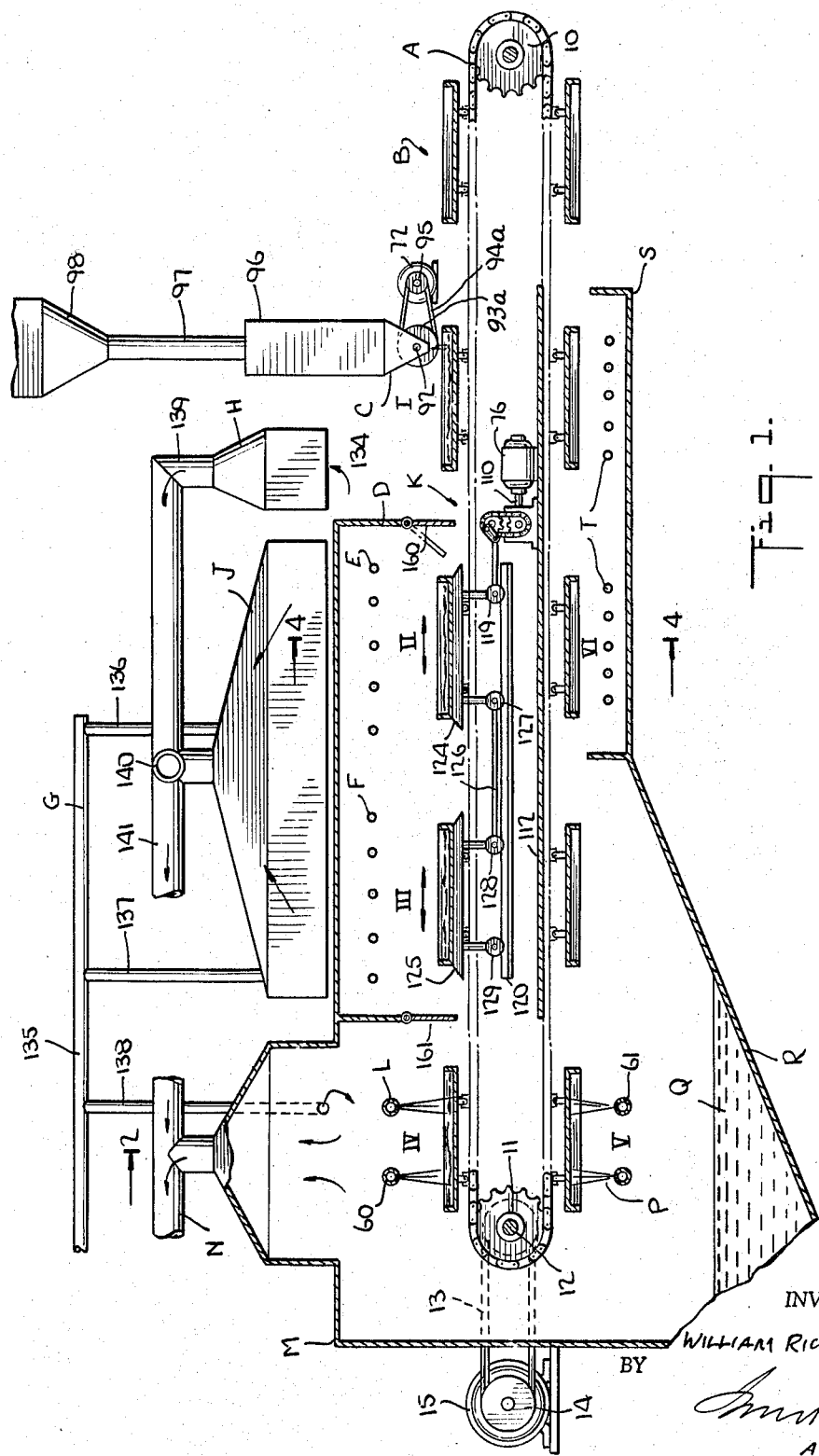
FIG. 1 is a side diagrammatic sectional view showing the various stages in the operation according to the present invention.

Referring to FIG. 1, there is shown a continuous conveyor chain A which carries a plurality of trays B upon which at the position I is spread a uniform thin layer of caustic potash and naphthalene sulfonic acid by the spreader mechanism C.

These trays are then passed under the enclosure or main oven D where at stage II, they are subjected to a dehydration operation to remove the water and melting at about 250° C. and then to a fusion operation at position III to replace the sulfo-groups by hydroxy-groups.

During this period they are being heated by the heaters E and F and inert gases by the conduits G (such as combustion gases) are forced into the chamber D so that it will have a positive pressure with any excess passing out through the openings being taken up by the fume hoods H and J.

During both states II and III, the trays are vigorously vibrated by the vibrating or shaking mechanisms K. Then the trays are passed to position or stage IV where they are quenched from a water sprayer L in the second upper enclosure M from which steam may be drawn out by an exhaust system indicated at N.

Then the trays are reversed as indicated at position V and are rinsed by the washers P with the naphthol liquors being received at Q in the lower part of the enclosure R.

The trays in inverted position then pass into the final under chamber or enclosure S where they are heated by the heaters T to preheat them at stage or position VI before they are returned to the filling position at I after again being turned into upright position.

This entire operation can take place continuously and fairly quickly with a high rate of production in high yields.

To specifically refer to the driving mechanism, the chain A is carried on a forward sprocket 10 and the drive is transmitted through the rear sprocket shaft 12 of the rear sprocket 11 by means of the belt or chain drive 13 which connects with the sprocket 23 (see FIG. 2) on the end of the shaft 12.

The shaft 12 projects through the wall 24 through the bearing 25 on the bracket 26. The chain or belt 13 is driven from the pulley 14 of the motor 15 (see FIGS. 1 and 2).

Referring to FIG. 4, it will be noted that each tray B has a bottom 16 with the side walls 17 which are about twice to three times the depth 18 of the material which has been fused or reacted.

Each of the trays will have the support legs 19 extending from the bottom thereof which are engaged by the pins 20 in the members 21 connected to the links 22 of the chain A.

Figure 2:
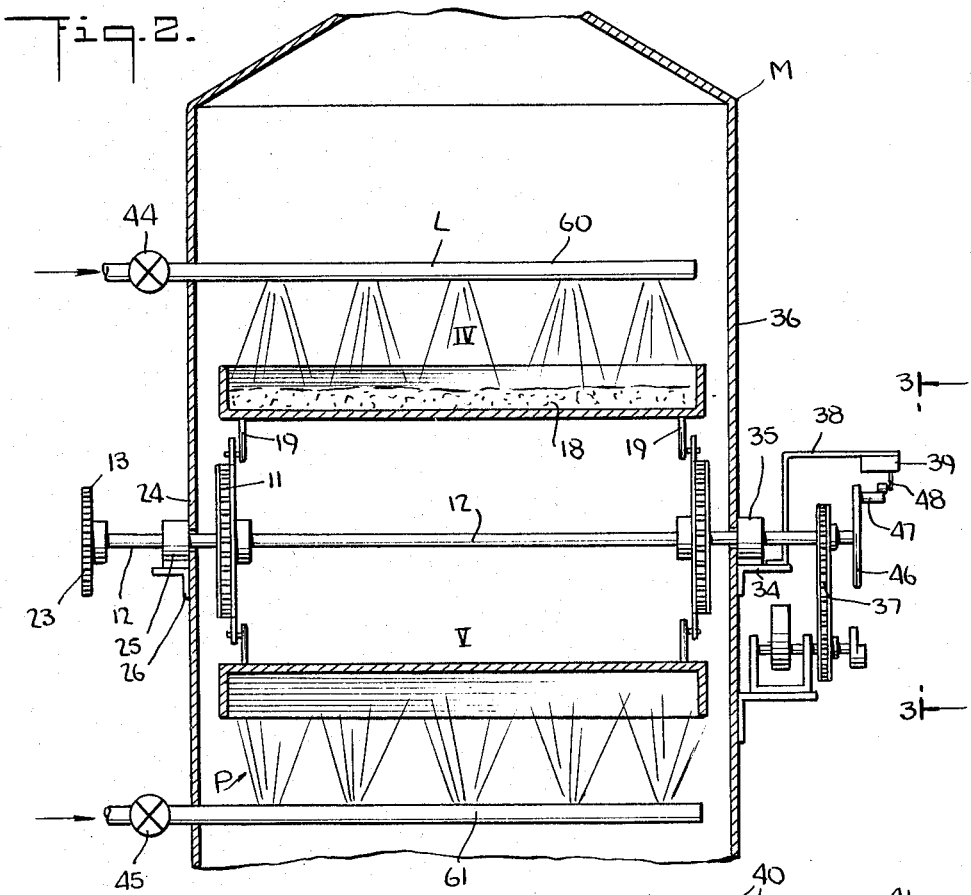
FIG. 2 is a transverse sectional view taken upon the line 2—2 of FIG. 1, showing the upper quenching and the lower rinsing stages.

Referring to FIG. 2, it will be noted that at the end of the apparatus adjacent the motor 15, there will be two side sprocket drives 11 on the shaft 12 with the shaft 12 extending through the bearings 35 and through the side 36 of the housing M to a sprocket drive 37 enclosed in the hood 38. The bearing 35 is supported on the bracket 34 (see FIG. 2).

The shaft 12 extends beyond the sprocket wheel 37 and carries the rotating disc member 46 with a rod 47 which at intervals will strike the lever 48 of the switch 39.

Figure 3:
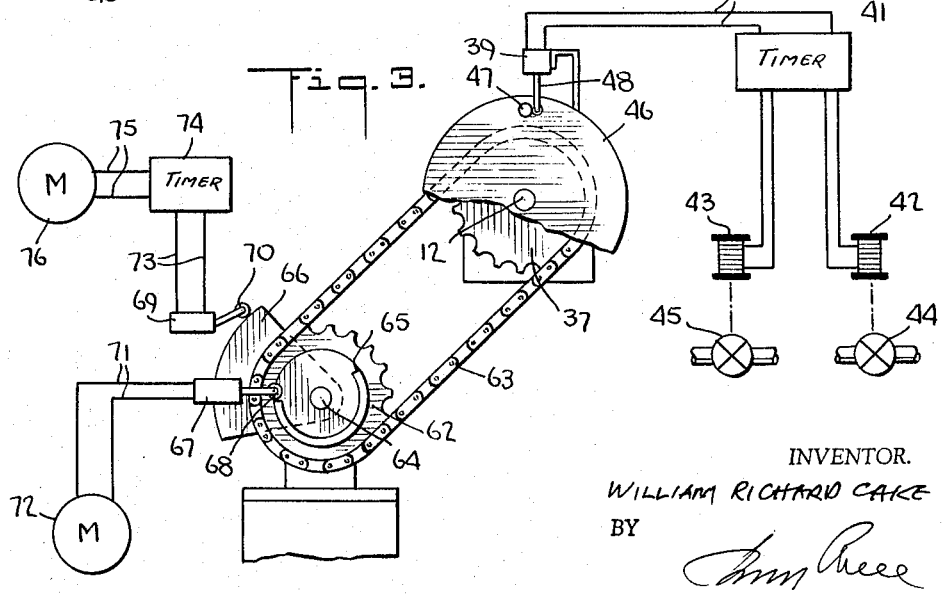
FIG. 3 is a side diagrammatic elevational view showing the drive mechanisms and the manner of timing of the device.

The switch 39 will be connected by the circuit 40 to the timer 41 which respectively has the solenoid or relay controls 42 and 43 to regulate the quenching valve 44 and the rinsing valve 45 associated with the spray systems L and P (see FIGS. 2 and 3).

The switch 39 may be a micro-switch and the valves 44 and 45 will be operated at intervals to spray water at the proper time as the tray is under or over the spraying nozzles 60 and 61 of the spray systems L and P (see FIG. 2).

Referring to FIG. 3, the sprocket 37 will also drive the sprocket 62 through the chain drive 63 which drives the shaft 64 having two cam members 65 and 66.

The cam members 65 and 66 will actuate the micro-switches 67 and 69. The cam member 65 will actuate the micro-switch 67 through the follower 68. The cam 66 will actuate the micro-switch 69 through the follower 70.

The micro-switch 67 has circuit connections 71 to the motor 72 driving the feeder or spreader C shown in small scale in FIG. 1 and in large scale in FIG. 6.

The micro-switch 69 has circuit connections 73 to the time 74 which in turn has circuit connections 75 to the drive motor 15 which drives the conveyor mechanism shown in small scale in FIG. 1 and in large scale in FIG. 3.

Referring to FIG. 6, the spreader or feeder hopper will extend transversely the full width of each tray B and the mixture 90 of the potassium hydroxide and naphthalene sulfonic acid will be passed through the outwardly projecting blades 91 of the spreader shaft 92 driven by the motor 72 at a rate which will assure a depth of material at 93 of about ⅝" which will be coordinated with the speed of movement in the direction 94 of the chain so that a certain uniform depth of material on each tray is obtained as the tray passes to the dehydration and the fusion stages II and III.

The shaft 92 is driven by the pulley 93a which in turn is driven by a belt or chain 94a from the pulley 95 driven by the motor 72 (see FIG. 1).

The material 90 will be supplied to the feeding hopper 96 by the tube 97 which receives it from the ribbon blender 98.

The agitating or vibrating apparatus is driven from the motor 76 (see FIG. 1) which has a shaft connection 110 to the gear reduction box 111 (see FIG. 5.)

The gear reduction box 111 is mounted on the fixed plate 112 and it is provided with a shaft 113 which drives the chain 114.

The chain 114 in turn will drive the sprocket 115 on the shaft 116.

This shaft 116 will drive a crank 117 connected to the reciprocating drive rod 118. This drive rod is connected to the flange wheels 119 which ride on the angle members 120.

These wheels are connected by the shafts 121 (see FIG. 4) and the cross members 122 and the upright members 123 to the plates 124 over which the trays will pass at stages II and III as shown in FIG. 1.

These support plates for the trays B will give these trays a vibrating motion successively or sequentially first in the direction of travel and then reversely so that there will be a longitudinal moving wave which will first pass in the direction of movement of the trays to one end of the trays and then to the reverse end of the trays and this prevents conglomeration and assures a uniform reaction and melting.

Referring to FIG. 1, it will be noted that the two successive plates 124 and 125 are connected by the link 126, and each are provided with the flanges rollers 119 and 127 for the plate 124 and 128 and 129 and for the plate 125, all of which ride on the angle rails 120.

Referring to FIG. 5, it will be noted that each tray B at the lower end of its carrying extension 19 has a pin 130 which fits in the opening 131 on the lug 132 carried by the chain A.

In the apparatus as shown in FIGS. 1 to 6, the inturns to the chamber D may be extended so as to cover or enclose the feeding hopper 96 where it delivers the material onto the tray B which is the second tray from the right shown in FIG. 1.

The inert gas may be fed into the chamber D at this point or at several points along the length of the chamber D.

In lieu of the wheels or rollers 119, 127, 128 and 129, it is possible to use slides with guiding tracks.

Referring to FIG. 1, it is sometimes desirable to eliminate preheaters indicated at T in the lower part right hand side of FIG. 1.

The triangular shape of the opening 131 will permit this vibratory longitudinal movement which in effect will cause the formation of a wave first moving toward the forward end of the trays and then moving toward the rearward end of the trays and assuring complete reaction and a high yield of the material.

It has been found that this fusion procedure although particularly applied to the production of naphthols by fusion process may also be broadly utilized in the production of other fusion reactions, and it will assure a very high rate of production at low cost and with high yield and with a minimum of manual supervision.

The hood arrangement as indicated at H and J in FIGS. 1 and 4 will draw off any excess inert or combustion gases as indicated at 133 and 134 which pass out through the openings of the enclosure D.

The piping arrangements generally indicated by G and having the piping connections 135 and 136, 137 and 138 will supply an inert gas preferably in heated condition so as not to cause any cooling of the reaction mixture to the enclosures D and M so that there will always be a positive pressure within these enclosures and no external air will enter.

The excess inert gas or combustion gases which may be fed into the enclosures D and M will be carried off by the pipes 139, 140 and 141 from the hoods or fume receptacles H and J.

Similarly the steam rising from the quenching operation in position IV will be removed through the conduits N.

The heaters T will heat the pans desirably up to about 300° so that in passing from position VI to position I they will not cool below the initial dehydration reaction temperature at position II which is maintained by the burner E.

The gates 160 and 161 as shown in FIG. 1 will separate the enclosures D from the enclosure M and will be pushed aside by each tray B as it passes thereunder.

The naphthol liquor Q may be readily pumped from the receptacle R to isolation vats.

To give some specific examples, of the present invention for different applications:

*Example No. 1.—Production of 1-amino-7-naphthol*

The blender is charged with 1750 pounds of powdered caustic potash and 575 pounds of dry 1,7-cleves acid.

After the continuous fusion machine is on temperature then a portion of the mix is dropped into the hopper and the feeding cycle is started.

The station time required is 120 seconds and 150 pans are processed to consume the blender charge.

Average pounds per pan of mix is 15 to 16 pounds. Hot water is applied at the quench and rinse stations for ten seconds.

The alkaline liquors are pumped to the product isolation equipment and given an average yield of 78 to 82% of 1-amino-7-naphthol.

*Example No. 2.—Production of 2,8-dihydroxy-3-naphthoic acid*

The blender is charged as in Example No. 1 with 600 pounds dry 8-sulfo-B-oxy naphthoic acid and 1800 pounds of powdered caustic potash. The fusion is carried out as in Example No. 1 but the station time is 180 seconds and the average pound per pan charge of mix is 13 to 14 pounds. The alkaline liquors produce an 80 to 85% yield of pure 2,8-dihydroxy-3-naphthoic acid.

*Example No. 3.—Production of 2,3-dihydroxy naphthalene-6-sulfonic*

The blender is charged with 600 pounds of dry R salt and 1800 pounds powdered caustic potash. The fusion is carried out as in Example No. 2. The alkaline liquors produce a 75 to 85% yield of pure 2,3-dihydroxy naphthalene-6-sulfonic.

*Example No. 4.—Production of 5-hydroxy iso phthalic acid*

The blender is charged with 600 pounds of dry 5-sulfo iso phthalic acid and 1200 pounds of powdered caustic potash. The fusion is carried out with a station time of 90 seconds and 10 to 12 pounds per pan average charge. The alkaline liquors produce a 85 to 90% yield of pure 5-hydroxy iso phthalic acid.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A continuous fusion reactor comprising a chain carrying a plurality of spaced apart trays, timed means to spread a reaction mixture in a thin layer on said trays, enclosures in which said trays are subjected to an elevated temperature to cause fusion, means to quench the reaction and means to dump the quenched reaction mass from the trays, said trays each having a base wall and side walls and each having downwardly extending connections from said base bottom wall to said chain, said chain having an upper horizontal reach moving in one direction and a lower horizontal reach moving in an opposite direction, said trays being positioned above the chain in horizontal upright position on said upper reach during the operation thereon of the means to spread and means to quench and while passing through said enclosures and said trays being positioned below said chain and in inverted horizontal position during the operation of said means to dump, said trays at all times being separate from although carried by said chain and timing means associated with movement of the chain and trays to operate the quench means only when a tray is positioned relative thereto to be quenched and to operate the means to spread when a tray is properly positioned relative thereto.

2. The reactor of claim 1, including shaker means separate from the chain and associated with the trays undergoing heating, arranged to cause an oscillation in the direction of movement as soon as the powdered mixture is subjected to elevated temperature so as to cause a swishing backwardly and forwardly of the reaction mass as it is being fused.

3. A continuous fusion reactor comprising a chain carrying a plurality of spaced apart trays, timed means to spread a reaction mixture in a thin layer on said trays, enclosures in which said trays are subjected to an elevated temperature to cause fusion, timed means to quench the reaction and means to dump the quenched reaction mass from the trays, and shaker means separate from said chain and connected to the trays undergoing heating to shake said trays during said temperature treatment to cause a vibration wave to first pass forwardly through the material and then rearwardly through the material in the direction of motion of the trays, said trays each having a base wall and side walls and each having downwardly extending connections from said base bottom wall to said chain, said chain having an upper horizontal reach moving in one direction and a lower horizontal reach moving in an opposite direction, said trays being positioned above the chain in horizontal upright position on said upper reach during the operation thereon of the timed means to spread and timed means to quench, and while passing through said enclosures and said trays being positioned below said chain and in inverted horizontal position during the operation of said means to dump, said trays at all times being separate from although carried by said chain and timer means associated with the chain to cause operation of the feeder means and of the quench means when a tray is properly positioned relative thereto.

4. An apparatus for conducting a continuous fusion process, comprising an enclosure having two upper and two lower chambers and a first position upper heating chamber, a second position upper water spray chamber, a third position lower water spray chamber below said second position chamber, and a fourth position lower heating chamber below the first position chamber, and said apparatus also having a filling and spreading means before the two upper chambers, two successive sets of heating members in the first upper chamber, two water spray devices one in the upper spray chamber and the other in the lower spray chamber, said water spray device in the lower spray chamber serving to cause dumping of the fused material and heater means in said lower heating chamber, and a conveyer carrier having a first filling location outside of and before said enclosure, a second fusion location in said first chamber, a third water spray location in said second chamber, a fourth dumping location in said third chamber, and a fifth preheater location in said fourth chamber and a plurality of spaced apart trays to receive relatively thin layers of a chemical mixture to be reacted by fusion in said first filling location and carried through said chambers and locations in sequence by said carrier, and shaker means separate from said conveyor carrier connected to the trays when in the first position upper heating chamber to shake the trays during their passage therethrough to cause a vibration wave to pass forwardly through the chemical mixture therein then rearwardly in the direction of motion of the trays, and timer means associated with the chain to cause operation of the filling means and the water sprays only when a tray is properly positioned relative thereto.

5. The apparatus of claim 4, including quenching means to quench the trays in the second chamber, exhaust means to exhaust steam from the second chamber, said conveyor reversing the trays in the third and fourth chambers, and a collector to receive material dumped from the trays in the third chamber.

6. An apparatus for continuously fusing a mixture of caustic alkali and aromatic sulfonic acid in a thin layer of about ½ to ¾" in thickness in a first stage at about 250° C. and then in a second stage at 300° to 350° C. following by water spray quenching and water spray dumping to cause replacement of the sulfo group by a hydroxy group which comprises a horizontal continuous conveyer chain having an upper horizontal reach in one direction and a lower horizontal reach in an opposite direction, a plurality of spaced trays and carried by said chain in said upper reach in upright horizontal position and in said lower reach in inverted horizontal position, there being provided four positions in said upper reach including position I for spreading a uniform thin layer of the caustic and sulfonic acid, position II for conducting a dehydration operation, position III for conducting a fusion operation, position IV for conducting a quenching operation, all of which positions are on the upper reach and two treating positions on the lower reach including position V for conducting a dumping and rinsing operation and position VI for conducting pre-heating operation, a separate upper enclosure for enclosing the trays while in positions II and III and another upper enclosure for enclosing the trays in position IV on the upper reach and separate lower enclosures, including an enclosure for enclosing the trays in position V on the lower reach and another enclosure for the trays at position VI on the lower reach, and a feeder and spreader acting upon the trays in position I to spread a uniform thin layer of alkali and sulfonic acid therein, successive heaters in positions II and III for successively subjecting the thin layer to 250° C. and then to 325° to 350° C., water spray quenchers acting upon the trays in position IV all in the upper reach, water spray rinsers acting upon the trays at position V in the lower reach and successive heaters acting upon the trays at position VI in the lower reach, and shaker means separate from said conveyor carrier connected to the trays when in the first position upper heating chamber to shake the trays during their passage therethrough to cause a vibration wave to pass forwardly through the chemical mixture therein then rearwardly in the direction of motion of the trays, and timer means associated with the conveyor carrier to cause operation of the filling means and of the water spray quenchers only when a tray is properly positioned relative thereto.

References Cited by the Examiner
UNITED STATES PATENTS

| | | | |
|---|---|---|---|
| 1,493,758 | 5/1924 | Lamie | 263—8 |
| 1,732,916 | 10/1929 | Summey | 263—8 |
| 1,761,028 | 6/1930 | Williams | 263—8 |
| 1,906,092 | 4/1933 | Peterson | 214—21 X |
| 1,949,243 | 2/1934 | Cotton | 260—628 |
| 2,164,247 | 6/1939 | Knudsen | 214—21 X |
| 2,179,080 | 11/1939 | Alther | 214—21 X |
| 2,760,992 | 8/1956 | Schoeffel et al. | 260—628 |

MORRIS O. WOLK, *Primary Examiner.*

CHARLES B. PARKER, MAURICE A. BRINDISI,
*Examiners.*

H. G. MOORE, A. J. STEWART, J. H. TAYMAN,
*Assistant Examiners.*